United States Patent
Peng et al.

(10) Patent No.: US 7,397,606 B1
(45) Date of Patent: Jul. 8, 2008

(54) MENISCUS HEAD UP DISPLAY COMBINER

(75) Inventors: Guolin Peng, Cedar Rapids, IA (US); Martin J. Steffensmeier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 237 days.

(21) Appl. No.: 11/196,904

(22) Filed: Aug. 4, 2005

(51) Int. Cl.
*G02B 27/14* (2006.01)

(52) U.S. Cl. .......... 359/630; 359/634

(58) Field of Classification Search .......... 359/630, 359/634
See application file for complete search history.

(56) References Cited

U.S. PATENT DOCUMENTS

| | | | |
|---|---|---|---|
| 4,218,111 A | 8/1980 | Withrington | |
| 4,900,133 A | 2/1990 | Berman | |
| 4,968,117 A | 11/1990 | Chern | |
| 5,355,224 A * | 10/1994 | Wallace | 359/631 |
| 5,436,763 A | 7/1995 | Chen | |
| 5,684,634 A * | 11/1997 | Rogers | 359/630 |
| 5,880,879 A * | 3/1999 | Foo | 359/356 |
| 5,907,416 A | 5/1999 | Hegg | |
| 6,088,165 A | 7/2000 | Janeczko | |
| 6,111,703 A * | 8/2000 | Hozumi | 359/772 |
| 6,236,511 B1 | 5/2001 | Brown | |
| 6,567,014 B1 | 5/2003 | Hansen | |
| 6,801,362 B1 | 10/2004 | Brown | |
| 7,095,562 B1 * | 8/2006 | Peng et al. | 359/630 |
| 2005/0024749 A1 | 2/2005 | Nanba | |

OTHER PUBLICATIONS

Introduction to Optics, 2nd ed.☐☐Frank L. Pedrotti, S.J. & Leno S. Pedrotti☐☐Prentice Hall, 1993☐☐Chapter 19, pp. 391-405.*
Organic Led Displays (OLEDS)—The Next Trend? Audioholics.com Online A/V Magazine, Apr. 17, 2005, pp. 1-4.

* cited by examiner

*Primary Examiner*—Joseph Martinez
*Assistant Examiner*—James R Greece
(74) *Attorney, Agent, or Firm*—Nathan O. Jensen; Kyle Eppele

(57) ABSTRACT

A meniscus combiner for a head up display (HUD) system. The meniscus combiner includes a meniscus lens; a multi-layer dichroic coating formed on a first surface of the meniscus lens; and, an anti-reflection coating formed on a second, opposite surface of the meniscus lens. The meniscus combiner preferably utilizes a non-symmetric aspheric meniscus lens which simplifies the optical system of the image source (overhead or in-dash unit) minimizing aberrations and minimizing costs. The meniscus combiner may be fabricated utilizing a number of lens sections which may be bonded together and blended. Use of multiple lens sections provides the ability to easily optimize the lens design. Alternatively, the meniscus combiner can be fabricated from a single lens.

15 Claims, 3 Drawing Sheets

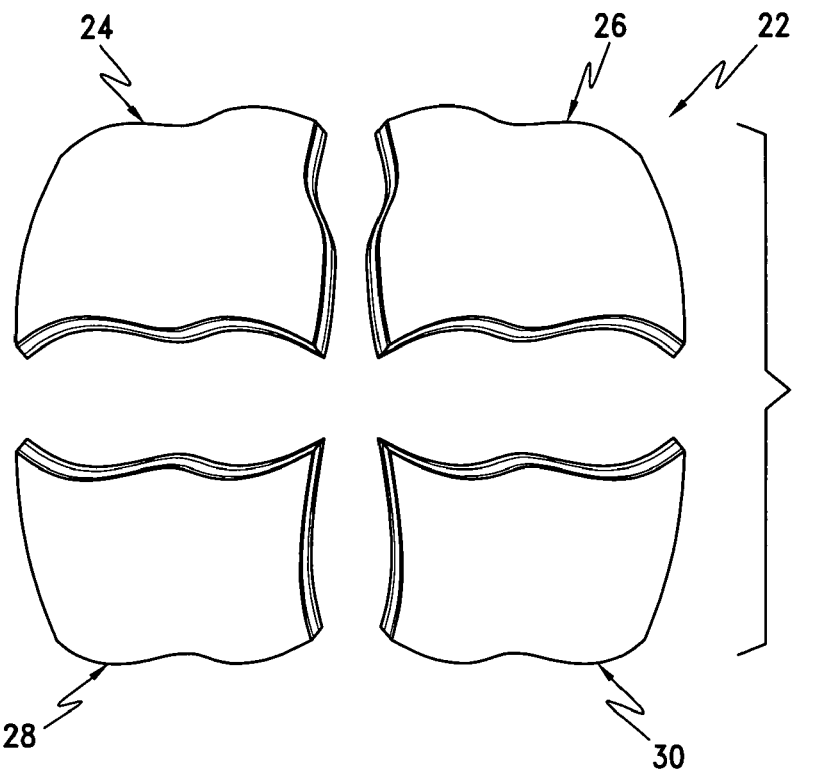
FIG. 4
FIG. 5
FIG. 6
FIG. 7
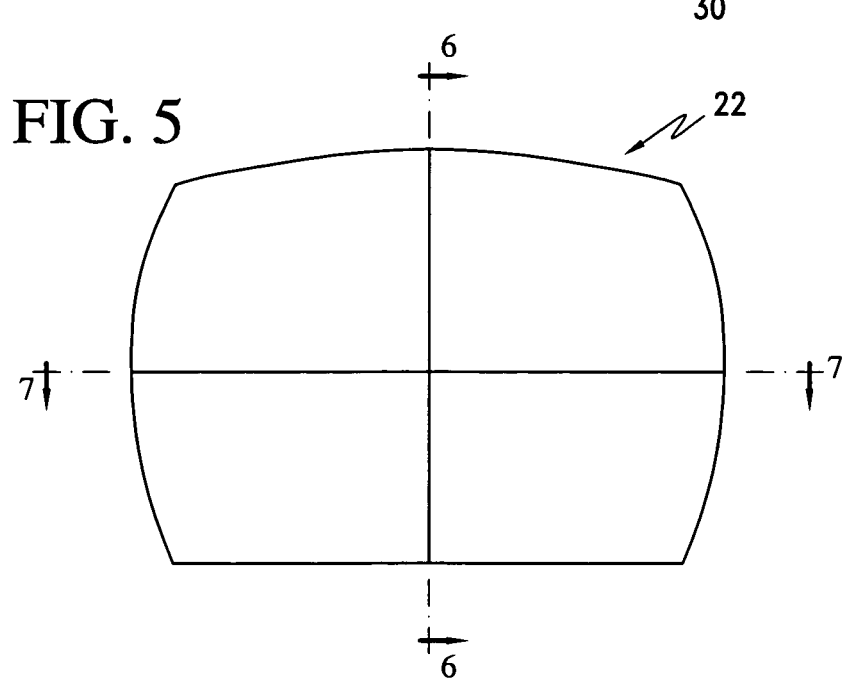

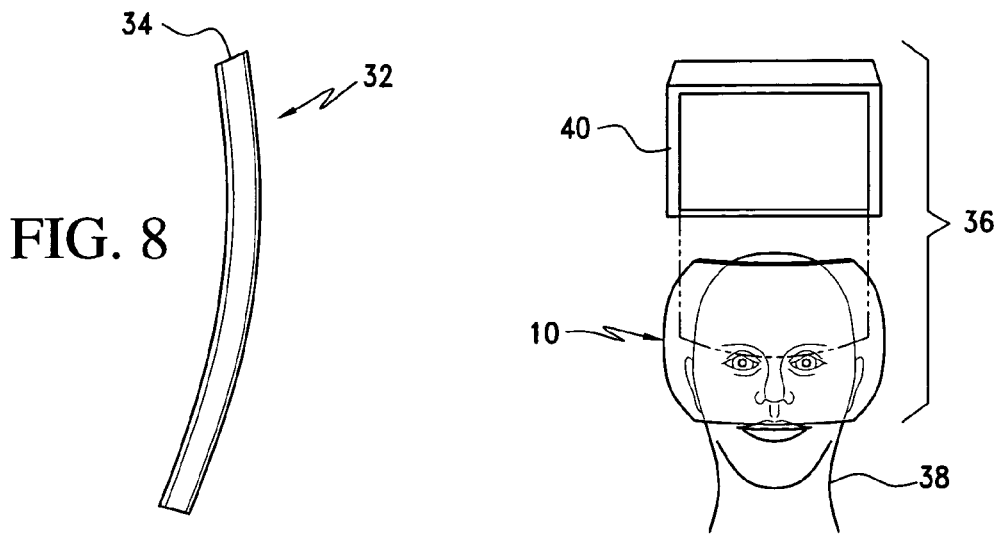
FIG. 8
FIG. 9
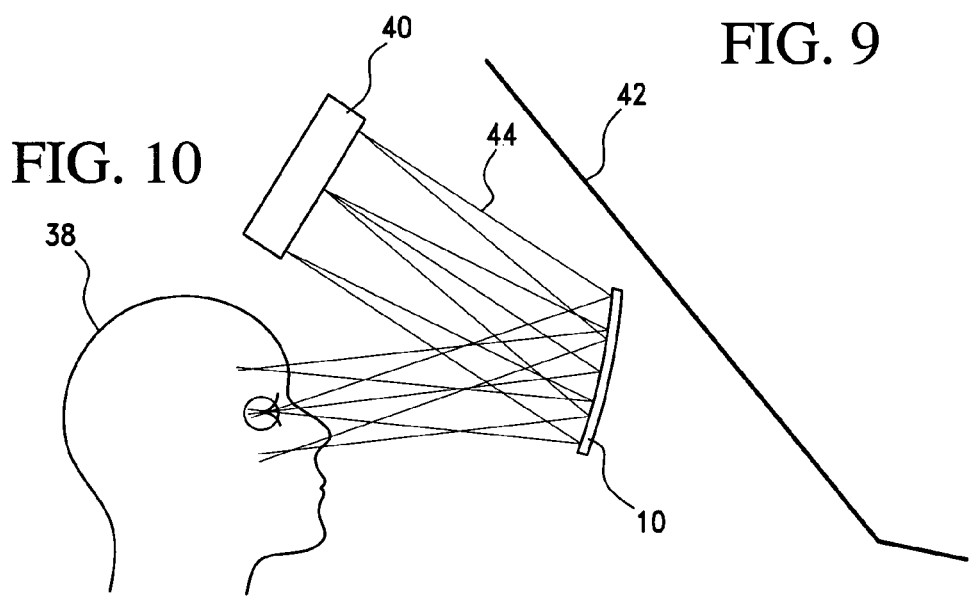
FIG. 10
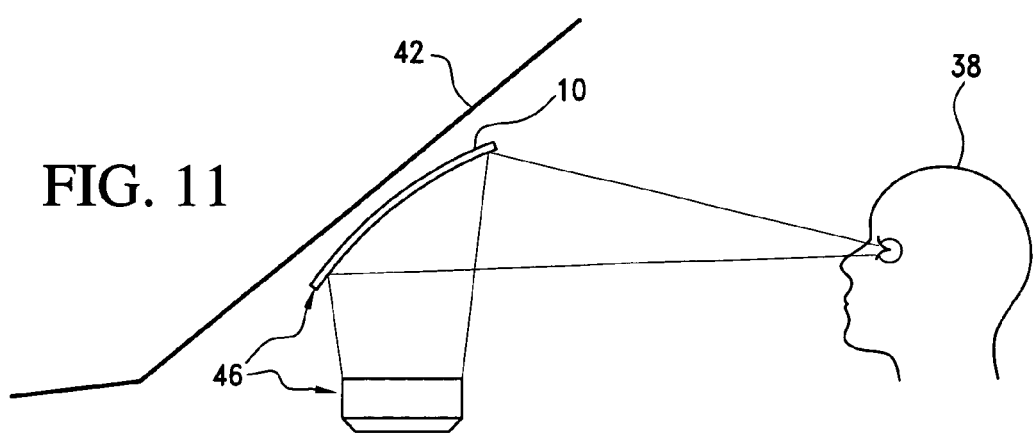
FIG. 11

MENISCUS HEAD UP DISPLAY COMBINER

BACKGROUND OF THE INVENTION

1. Field of the Invention

The present invention relates to head up display (HUD) systems and more particularly to a meniscus combiner for a HUD.

2. Description of the Related Art

A Head Up Display (HUD) is a means of projecting information directly into a human's visual field. The HUD was pioneered for military aviation and has since been used in other applications. HUDs are typically used in aircraft to provide pilots with information superimposed onto their forward field of view through the aircraft windshield. The information displayed may be data or symbolic images indicative of flight conditions such as the operating condition of the aircraft, environmental information or guidance information for use in directing the aircraft to its destination. These images are presented in overlying fashion on the pilot's field of view so as not to interfere with the pilot's view of the background scene.

The combiner of the HUD is s critical component to provide a collimated display image to an operator for a given Field of View (FOV) at a given design reference point. The HUD combiner components are generally large in size. The current HUD combiners are typically comprised of two optical components and with reflection holograms or dielectric coatings on some of the surfaces. They are cemented together or co-mounted in the HUD system configuration which induces complicated assembly and high cost of the HUD system.

Often, HUD applications include the use of combiners with doublet lens. The doublet combiner is composed of a convex front lens and a concave back lens. The convex surface of the convex lens is dichroic or holograhphically coated for reflecting the HUD format information. Since the optical power of the front lens cancels the optical power of the back lens, there is no optical effect when viewing through the combiner.

U.S. Pat. No. 5,907,416, entitled "Wide FOV Simulator Heads-Up Display With Selective Holographic Reflector Combined", issued to M. Cheren et al, discloses a wide field-of-view simulator heads-up display that provides images to a user along an optical axis. A HUD CRT provides images of a predetermined design wavelength, while rear projection screen CRTs provide out-of-window scenery that does not contain the predetermined design wavelength. A curved holographic combiner is mounted on the optical axis with a reflective hologram on a concave surface covered with a urethane overcoat. The convex surface has an antireflective coating. A tilted beamsplitter cooperates with a folding mirror in a relay optical system for providing a virtual image of the HUD CRT for reflection from the holographic combiner.

U.S. Pat. No. 4,968,117, entitled "Graded Index Aspheric Combiners and Display System Utilizing Same", issued to Chern et al, discloses an optical combiner that includes a substrate with at least one aspheric surface and a diffraction-type reflective coating formed on the substrate for selectively reflecting radiation within one or more predetermined narrow band ranges of wavelengths impinging on the coating. The asphericity of the surface may be selected to compensate or balance optical aberrations. The coating is advantageously a graded-index coating, which eliminates the possible degradation of gelatin hologram coatings due to moisture. A process for applying the graded-index coating to a substrate is disclosed. The variation in the index profile of the coating can be selected to provide the capability of combiners with multiple color reflectivity responses, or which allow use of display light sources of wider spectral bandwidth, resulting in a brighter image and improved angular bandwidth. In another disclosed embodiment, the combiner is incorporated in a biocular helmet visor display resulting in improved optical performance and a simpler, lightweight structure. In another embodiment, the combiner is incorporated into a head-up display for an aircraft resulting in improved performance, lower weight, improved safety and greater look-up capability.

U.S. Pat. No. 6,088,165, entitled "Enhanced Night Vision Device", issued to D. J. Janeczko et al, discloses night vision device comprising a facemask housing assembly having a peripheral surface defined by a rear surface contoured to a user's face and an open front surface, the housing assembly operative for encasing a pair of optical assemblies operative for receiving light from a viewed object via a first folded optical path and via a second direct optical path, combining the light from the first and second paths, and directing the combined light to a user's eye for viewing the object; where each optical assembly detachably coupled to the housing assembly. Each optical assembly comprises an objective lens assembly for receiving and focusing visible and infrared light from a viewed object along the first folded optical path; image intensifier means responsive to the focused light from the objective lens assembly for converting the visible and infrared light to visible intensified light; and beam combining means responsive to the visible intensified light and to the direct path light from combining with one another and directing the combination to the user's eye for viewing.

SUMMARY OF THE INVENTION

In a broad aspect, the present invention is a meniscus combiner for a head up display (HUD) system. The meniscus combiner includes a meniscus lens; a multi-layer dichroic coating formed on a first surface of the meniscus lens; and, an anti-reflection coating formed on a second, opposite surface of the meniscus lens. A meniscus lens is a lens with one convex and one concave side, the curvatures of both sides being equal.

The meniscus combiner preferably utilizes a non-symmetric aspheric meniscus lens which simplifies the optical system of the image source (overhead or in-dash unit) minimizing aberrations and minimizing costs.

The meniscus combiner may be fabricated utilizing a number of lens sections which may be bonded together and blended. Use of multiple lens sections provides the ability to easily optimize the lens design. Alternatively, the meniscus combiner can be fabricated from a single lens.

The present system provides utilization of small components minimizing costs and making it easy to manufacture. The present system minimizes vignetting.

Furthermore, the meniscus lens has substantially no transmissive optical power so that an out-of-windshield world can be viewed with little distortion by an operator.

BRIEF DESCRIPTION OF THE DRAWINGS

FIG. 4 is a perspective view of a second embodiment of a non-symmetric aspheric meniscus combiner of the present invention prior to the bonding of the four lens sections thereof.

FIG. 5 shows the four lens sections of the FIG. 4 embodiment bonded together to form a completed combiner.

FIG. 6 is a view taken along line 6-6 of FIG. 5.

FIG. 7 is a view taken along line 7-7 of FIG. 5.

FIG. 8 is a side view of a spherical meniscus combiner in accordance with the principles of the present invention.

FIG. 9 is a front perspective view of the combiner being utilized in an overhead mounted head up display system.

FIG. 10 is a side view of the FIG. 9 embodiment.

FIG. 11 is a side view of the combiner being used in an in-dash mounted HUD system.

The same elements or parts throughout the figures of the drawings are designated by the same reference characters.

DETAILED DESCRIPTION OF THE INVENTION

Figure 1:
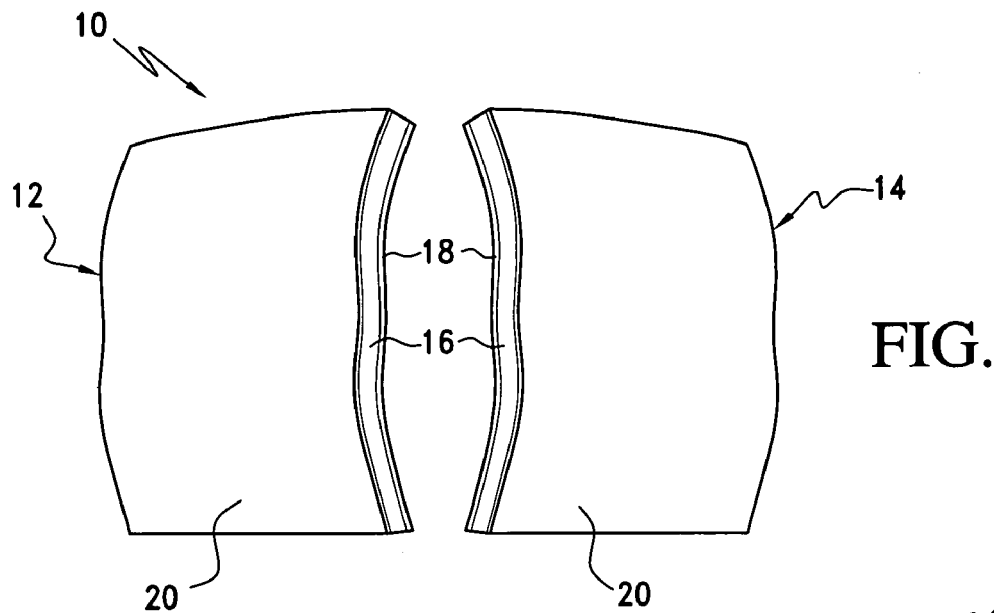
FIG. 1 is a perspective view of a first embodiment of a non-symmetric aspheric meniscus combiner of the present invention prior to the bonding of the two lens sections thereof.
Figure 2:
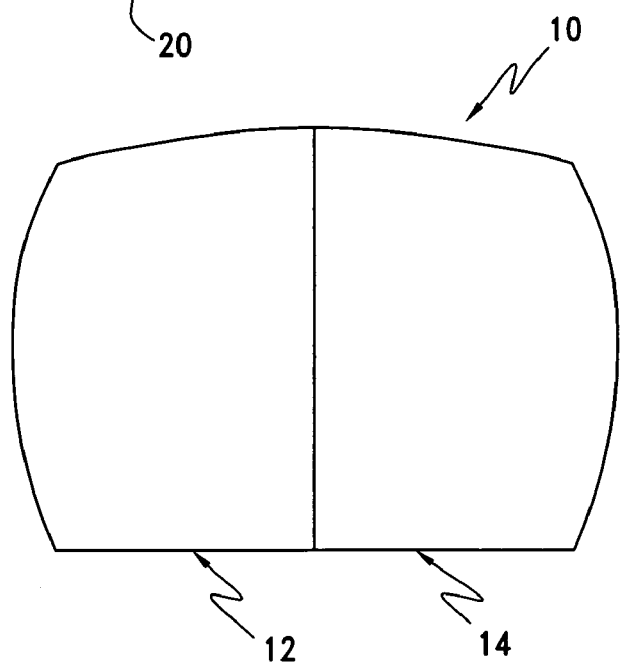
FIG. 2 shows the two lens sections of the FIG. 1 embodiment bonded together to form a completed combiner.
Figure 3:
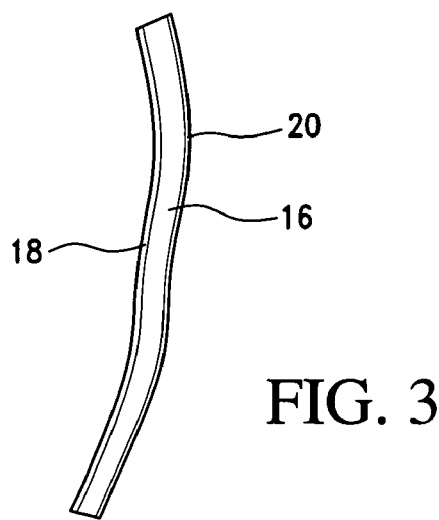
FIG. 3 is a side view of the combiner of FIGS. 1 and 2.

Referring now to the drawings and the characters of reference marked thereon, FIGS. 1-3 illustrate a first preferred embodiment of the meniscus combiner of the present invention, designated generally as 10. In this embodiment, as shown in FIG. 1, the combiner 10 may be fabricated by using, for example, a pair of lens sections 12, 14. Each lens section 12, 14 includes a meniscus lens 16. A multi-layer dichroic coating 18 is formed on a first surface of each of the meniscus lens sections 12, 14. An anti-reflection coating 20 is formed on a second, opposite surface of the meniscus lens 16. Each lens section 12, 14 is non-symmetric aspheric, i.e. contains non-spherical optical surfaces. Separate sections 12, 14 are bonded with suitable cement and blended together to from a single high performance component, as shown in FIG. 2.

Utilization of these piecewise aspheric lens sections 12, 14 allows for enhanced freedom in design. The meniscus lens 16 may be formed of a suitable material such as plastic or glass. The multi-layer dichroic coating 18 is preferably formed of a stack of quarterwave (QW) layers of alternating high- and low-index dielectric material so that the dichroic coating selectively reflects a desired narrow band head-up image wavelength. In one example, this is defined by a peak wavelength of 530 nm, 50% cutoff wavelengths of 507 nm and 546 nm; and photopic transmission greater than 75% from an eye center point. Such a dichroic coating 18 is commercially available. The dichroic coating is typically applied to the surface closest to the viewer.

The anti-reflection coating 20 is applied to the convex surface of the meniscus lens 16. In a preferred example, the anti-reflection coating is a broad band antireflective coating with an average reflectance of less than 0.2% from the wavelength of 420 nm to 680 nm. The 0.2% reflectance can be relaxed as long as there is no clear non required second mirror image. Suitable anti-reflection coatings are commercially available as well known in this field.

Referring now to FIGS. 4-7 a second embodiment of the meniscus combiner is illustrated, designated generally as 22. In this embodiment four aspheric lens sections 24, 26, 28, 30 are utilized. This embodiment emphasizes that fabrication utilizing various aspheric lens sections provides the ability to easily optimize the lens design. However, it is understood that a single meniscus lens could be used.

Referring now to FIG. 8, another example of the meniscus combiner is illustrated, designated generally as 32 which includes a spherical meniscus lens 34. The combiner 32 has a multi-layer dichroic coating 36 and broad band antireflective coating 38, as in the previous embodiments. If a spherical meniscus lens is utilized additional optical components may be required to minimize aberrations.

Referring now to FIG. 9, a front perspective view of the meniscus combiner 10 being utilized in an overhead mounted head up display system, designated generally as 36, is illustrated. This HUD system 36 is shown relative to an observer 38. A side view of this system 36 relative to the windshield 42 is shown as FIG. 10. Overhead mounted head up display systems are generally utilized with commercial aircraft. Such overhead mounted head up display systems typically include an image source for projecting an image.

The image source may be a transmissive LCD, reflective LCD, digital micromirror device, laser display, or the like. The present invention may utilize the LCD an an image source 36, which may generate images (shown by optical ray traces 44) with very high contrast ratios. This is particularly the case when non-lambertian light sources are used in combination with the LCD. Being illuminated by highly efficient LEDs (Light Emitting Diodes) (with green LEDs being the most typical for HUD use), the flat panel LCD may be made very thin and light weight. Moreover, at least one of a compensation film, a Fresnel type lens, a holographic device, or a brightness enhancement film may be included with the LCD to tailor (i.e., manage or redirect) the light passing through the LCD.

In one exemplary embodiment the image source 38 includes 1) an illumination system that includes a high power light emitting diode (LED) array assembly and a Fresnel lens array operatively associated with the LED array assembly for receiving light produced by the LED and providing a nearly collimated light output for use by a spatial light modulator; and, 2) a spatial light modulator for receiving the nearly collimated light output. This illumination system is fully described and claimed in the patent application, U.S. Ser. No. 11/196999, by co-applicants, G. Peng and M. J. Steffensmeier, entitled "Illumination System For a Head Up Display" filed concurrently herein bearing assignee Rockwell Collin's Internal Docket No. 04CR438/KE. This co-filed patent application is incorporated by reference herein in its entirety. The high power light emitting diode (LED) array assembly, in this advanced compact HUD includes LED's each having a luminous output of greater than 15 lumens and preferably greater than 20 lumens. In a preferred embodiment each LED has an output of about 36 lumens. The LED array assembly includes suitable driving electronic circuitry 16 for powering the LEDs and an LED heat sink, as is well known in this field. Furthermore, a suitable LED light baffle is utilized as is also well known in this field. A diffuser is preferably positioned to receive light from the Fresnel lens array. The diffuser 25 may be, for example, a holographic diffuser (i.e. holographic light shaping diffuser (HLSD)) or bulk scattering diffuser. For the HUD application discussed above, the diffuser angle may be less than 20 degrees. In an alternative arrangement the positions of the diffuser 25 and the Fresnel lens array 22 may be switched. At least one brightness enhancement film (BEF) 26, 28 is preferably used to receive the light from the diffuser 25. Such prismatic BEF's are commercially available from companies such as 3M Company, St. Paul Minn. that markets BEFs under the trademark Vikuiti™. A dual brightness enhancement filter, DBEF, may be utilized. An image directing film (IDF), typically a transparent optical composite prismatic film, redirects the output image of the BEF, to the optimum viewing angle.

The image from the IDF is finally directed to the spatial light modulator 24 prior to being presented to the combiner. In the preferred advanced compact HUD embodiment discussed above, the spatial light modulator is an LCD, preferably a TFT (thin film transistor) (i.e. active-matrix) LCD. Instead of utilizing a Fresnel lens a collimating lens may be used for providing a nearly collimated light output for use by the spatial light modulator. In such an instance, the collimating lens may, for example, be molded into the plastic case of the LED array assembly.

Referring now to FIG. 11, a side view of the meniscus combiner 10 being utilized in an in-dash mounted head up display system, designated generally as 46, is illustrated. In-dash mounted head up display systems are generally utilized with military aircraft.

Although the meniscus combiner has been described relative to its use with overhead mounted and dash mounted displays the image source may be located at nearly any position, i.e. sides, top, bottom, or at another angle relative to the combiner.

The meniscus lens preferably provides a total field of view between 10° (H)×8° (V) and 40° (H)×36° (V) when located at a distance ranging from about 6 inches to about 24 inches in front of an operator.

The HUD in which this illumination system may be incorporated in may be foldable up into a cockpit ceiling of a vehicle such as but not limited to an aircraft. Or, it may be positionable behind a dashboard of a vehicle such as but not limited to an aircraft. U.S. Ser. No. 11/197006, entitled, "Advanced Compact Head Up Display", filed concurrently herewith, by co-applicants, G. Peng and M. J. Steffensmeier, and assigned to the present assignee (bearing Rockwell Collins Internal Docket No. 04CR437/KE), discloses a HUD display system including these features. This co-filed patent application is incorporated by reference herein in its entirety. This provides a head-motion-box having dimensions greater than about 3 inches horizontal, 2 inches in vertical, and 4 inches in depth. (The head-motion-box defines a volume within which at least part of the HUD image information can be viewable.) Alternative image sources may include, for example, organic LEDs (OLEDs).

Referring again to FIGS. 1-3 embodiment, the non-symmetric aspheric meniscus lens has a first fitting radius of curvature in a range of between about 15 and 30 inches and a second fitting radius of curvature approximately 3 inches greater than the first fitting radius of curvature. The second fitting radius of curvature is orthogonal to the first fitting radius of curvature. The first fitting radius of curvature is defined by an upper edge point, a lower edge point and a central point of the meniscus lens. The second fitting radius of curvature is defined by a left side edge, a right side edge, and the central point. The first fitting radius of curvature is preferably about 20 inches and the second fitting radius of curvature is approximately 23 inches.

Although the meniscus combiner of the present invention has been described relative to its application as a combiner for a HUD for a vehicle (such as but not limited to an aircraft), it may have applications for other HUD systems such as flight training systems.

Other embodiments and configurations may be devised without departing from the spirit of the invention and the scope of the appended claims.

The invention claimed is:

1. A meniscus combiner for a head up display (HUD) system, comprising:
   a non-symmetric aspheric meniscus lens having a first fitting radius of curvature in a range of between about 15 and 30 inches and a second fitting radius of curvature approximately 3 inches greater than said first fitting radius of curvature, said second fitting radius of curvature being orthogonal to said first fitting radius of curvature;
   a multi-layer dichroic coating formed on a first surface of said meniscus lens; and,
   an anti-reflection coating formed on a second, opposite surface of said meniscus lens.

2. The meniscus combiner of claim 1, said HUD system being implemented in a vehicle having a windshield for providing an exterior view, wherein said meniscus lens has substantially no transmissive optical power so that an out-of-windshield world can be viewed with little distortion by an operator.

3. The meniscus combiner of claim 1, said HUD system being implemented in a vehicle, wherein said meniscus lens provides a total field of view between 10° (H)×8° (V) and 40° (H)×36° (V) when located at a distance ranging from about 6 inches to about 24 inches in front of an operator.

4. The meniscus combiner of claim 1, wherein,
   said meniscus lens includes an upper edge point, a lower edge point and a central point defining said first fitting radius of curvature; and,
   said meniscus lens further includes a left side edge and a right side edge, which, with said central point, defines said second fitting radius of curvature.

5. The meniscus combiner of claim 1, wherein said meniscus lens has a first fitting radius of curvature of about 20 inches and a second fitting radius of curvature of approximately 23 inches, wherein,
   said meniscus lens includes an upper edge point, a lower edge point and a central point defining said first fitting radius of curvature; and,
   said meniscus lens further includes a left side edge and a right side edge, which, with said central point, defines said second fitting radius of curvature.

6. The meniscus combiner of claim 1, wherein said meniscus lens comprises a plurality of lens sections bonded to each other and blended so as to form a single high performance component.

7. The meniscus combiner of claim 1, wherein said meniscus lens is formed of plastic.

8. The meniscus combiner of claim 1, wherein said meniscus lens is formed of glass.

9. The meniscus combiner of claim 1, wherein said multi-layer dichroic coating is formed of a stack of quarterwave (QW) layers of alternating high- and low-index dielectric material wherein said dichroic coating selectively reflects a desired narrow band head-up image wavelength.

10. The meniscus combiner of claim 1, wherein said anti-reflection coating is applied to a convex surface of said meniscus lens, said anti-reflection coating being a broad band anti-reflective coating with an average reflectance of less than 0.2% from the wavelength of 420 nm to 680 nm.

11. The meniscus combiner of claim 1, said HUD system being implemented in an aircraft.

12. A meniscus combiner for a head up display (HUD) system, comprising:
   a meniscus lens;
   a multi-layer dichroic coating formed on a first surface of said meniscus lens, wherein said multi-layer dichroic coating is formed of a stack of quarterwave (QW) layers of alternating high- and low-index dielectric material wherein said dichroic coating selectively reflects a desired narrow band head-up image wavelength defined by a peak wavelength of 530 nm, 50% cutoff wavelengths of 507 nm and 546 nm; and photopic transmission being greater than 75% from an eye center point; and
   an anti-reflection coating formed on a second, opposite surface of said meniscus lens.

13. A head up display (HUD) system, comprising:
a meniscus combiner, comprising:
   i. a non-symmetric aspheric meniscus lens having a first fitting radius of curvature in a range of between about 15 and 30 inches and a second fitting radius of curvature approximately 3 inches greater than said first fitting radius of curvature, said second fitting radius of curvature being orthogonal to said first fitting radius of curvature;
   ii. a multi-layer dichroic coating formed on a first surface of said meniscus lens; and,
   iii. an anti-reflection coating formed on a second, opposite surface of said meniscus lens; and,
an image source operatively associated with said meniscus combiner for projecting an image to said meniscus combiner for observation in combination with an observer's visual exterior view of an outside scene.

14. The head up display (HUD) system of claim 13 wherein said image source, comprises:
an illumination system, comprising:
   i. a high power light emitting diode (LED) array assembly; and,
   ii. a Fresnel lens array operatively associated with said LED array assembly for receiving light produced by said LED and providing a nearly collimated light output for use by a spatial light modulator; and,
a spatial light modulator for receiving said nearly collimated light output.

15. A method for fabricating a meniscus combiner for a head up display (HUD) system, comprising:
a) providing a plurality of lens sections, each lens section comprising:
   i. a non-symmetric aspheric meniscus lens having a first fitting radius of curvature in a range of between about 15 and 30 inches and a second fitting radius of curvature approximately 3 inches greater than said first fitting radius of curvature, said second fitting radius of curvature being orthogonal to said first fitting radius of curvature;
   ii. a multi-layer dichroic coating formed on a first surface of said meniscus lens; and,
   iii. an anti-reflection coating formed on a second, opposite surface of said meniscus lens; and,
b) bonding said plurality of lens sections together to form a single component.

* * * * *